United States Patent
Baker

(10) Patent No.: US 7,657,725 B2
(45) Date of Patent: Feb. 2, 2010

(54) INTEGRATED CIRCUIT WITH MEMORY-LESS PAGE TABLE

(75) Inventor: David Cureton Baker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 260 days.

(21) Appl. No.: 11/166,503

(22) Filed: Jun. 24, 2005

(65) Prior Publication Data

US 2006/0294340 A1   Dec. 28, 2006

(51) Int. Cl.
 *G06F 12/00* (2006.01)

(52) U.S. Cl. .................. 711/206; 711/203; 710/26; 710/74

(58) Field of Classification Search ................. 711/206
See application file for complete search history.

(56) References Cited

U.S. PATENT DOCUMENTS

| 5,479,628 | A | | 12/1995 | Olson et al. |
| 5,696,925 | A | * | 12/1997 | Koh ........................... 711/203 |
| 5,897,664 | A | * | 4/1999 | Nesheim et al. ............. 711/206 |
| 6,393,544 | B1 | | 5/2002 | Bryg et al. |
| 6,715,057 | B1 | | 3/2004 | Kessler et al. |
| 6,728,859 | B1 | * | 4/2004 | Kissell ....................... 711/206 |
| 7,149,862 | B2 | * | 12/2006 | Tune et al. .................. 711/163 |
| 7,428,626 | B2 | * | 9/2008 | Vega ........................... 711/203 |
| 2002/0091779 | A1 | | 7/2002 | Donoho et al. |
| 2003/0212878 | A1 | * | 11/2003 | Ting ............................ 712/23 |

FOREIGN PATENT DOCUMENTS

EP   1 528 474 A2   5/2005

OTHER PUBLICATIONS

Harrod, P. L., et al. "Boundary Scan Design for a Memory Controller," IEE Colloquium on Application and Development of the Boundary-Scan Standard, Dec. 1990, pp. 3/1-3/2.

* cited by examiner

*Primary Examiner*—Christian P Chace
*Assistant Examiner*—Matthew Bradley
(74) *Attorney, Agent, or Firm*—Toler Law Group

(57) ABSTRACT

A system is disclosed that comprises a processor, a memory-less first level page table addressable by the processor, and a second level page table stored in a memory coupled to the processor. The second level page table is addressable by at least one entry of the first level page table.

27 Claims, 5 Drawing Sheets

INTEGRATED CIRCUIT WITH MEMORY-LESS PAGE TABLE

FIELD OF THE DISCLOSURE

The present disclosure relates to a system and method of using a memory-less page table.

BACKGROUND

Integrated circuit devices used in embedded applications have access to a limited amount of computer memory. For example, processors that are used in portable devices have significant processing and functionality requirements but have access to a limited amount of computer memory due to the small size of the portable device, such as personal digital assistant, a cellular phone, or an MP3 audio player. In addition, processor devices often utilize virtual memory techniques that require use of one or more paging tables to map from virtual memory to physical memory addresses. The paging tables are stored in the memory and consume memory space.

To address the need to conserve memory space in certain applications, one method has been described of reducing the size of paging tables using compression techniques. While compression techniques reduce the memory size of the paging table, such compression techniques also add overhead and additional complexity to the process of accessing memory. The added complexity adds to system costs and can affect processing performance.

Accordingly, there is a need for an improved system and method of using memory and paging tables.

DETAILED DESCRIPTION OF THE DRAWINGS

Figure 1:
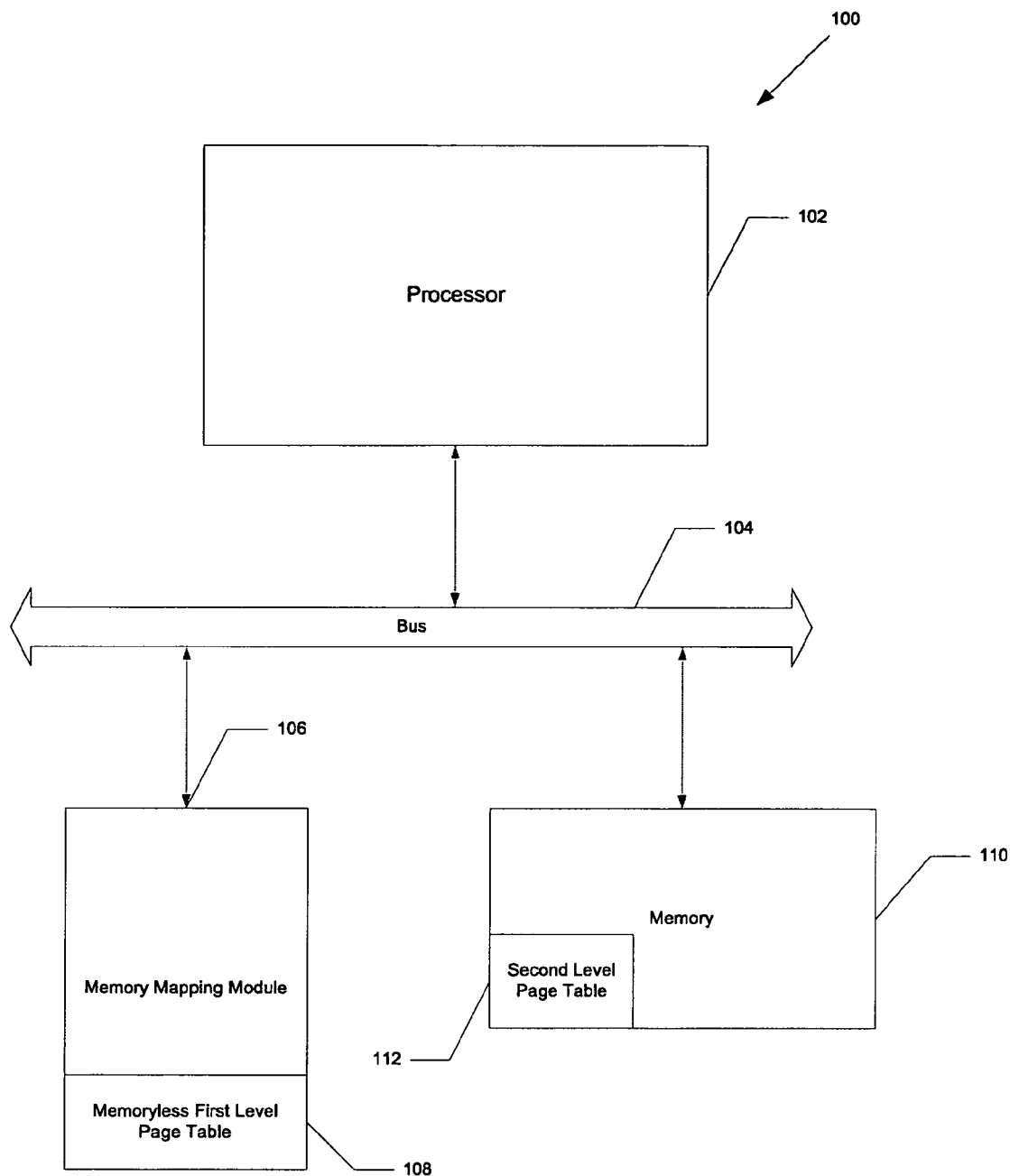
FIG. 1 is a block diagram that illustrates an integrated circuit including a processor and a memory-less page table.

Referring to FIG. 1, an integrated circuit 100 including a processor 102, a memory bus 104, a memory mapping module 106, and a computer readable memory 110 is shown. The memory mapping module 106 includes a memory-less first level page table 108. The physical computer memory 110 includes a second level page table 112. The memory mapping module 106 is coupled to the memory bus 104. Similarly, the memory device 110 is coupled to the memory bus 104, which in turn is coupled to the processor 102.

During operation, the processor device 102, via the memory bus 104, may initiate addresses to the first level page table 108 within the memory mapping module 106. The processor 102 may address the first level page table to receive memory addresses. In addition, the second level page table 112 stored within the memory 110 is addressable by one or more entries within the first level page table 108. In a particular illustrative embodiment, the processor device 102 may retrieve a first level memory address from the first level page table 108 and may then access the second level page table 112 to retrieve a second level address. The processor 102 may access the computer memory 110 at the data location indicated by the second level address to retrieve data from such address for further processing.

It should be noted that the first level page table includes a plurality of entries that may be implemented in logic gates and the second level page table 112 includes a plurality of memory addresses that are implemented as a portion of the computer readable memory 110. Thus, the second level page table is stored within the memory, but the first level page table 108 is not stored in the memory and is implemented as a memory-less module. Also, it should be noted that in a particular illustrative embodiment, the memory-less first level page table 108 is implemented as circuitry that is embedded within the integrated circuit 100 and does not utilize external memory. Thus, the memory-less first level page table 108 beneficially provides first level paging functionality without consuming valuable memory resources within the integrated circuit 100.

Figure 2:
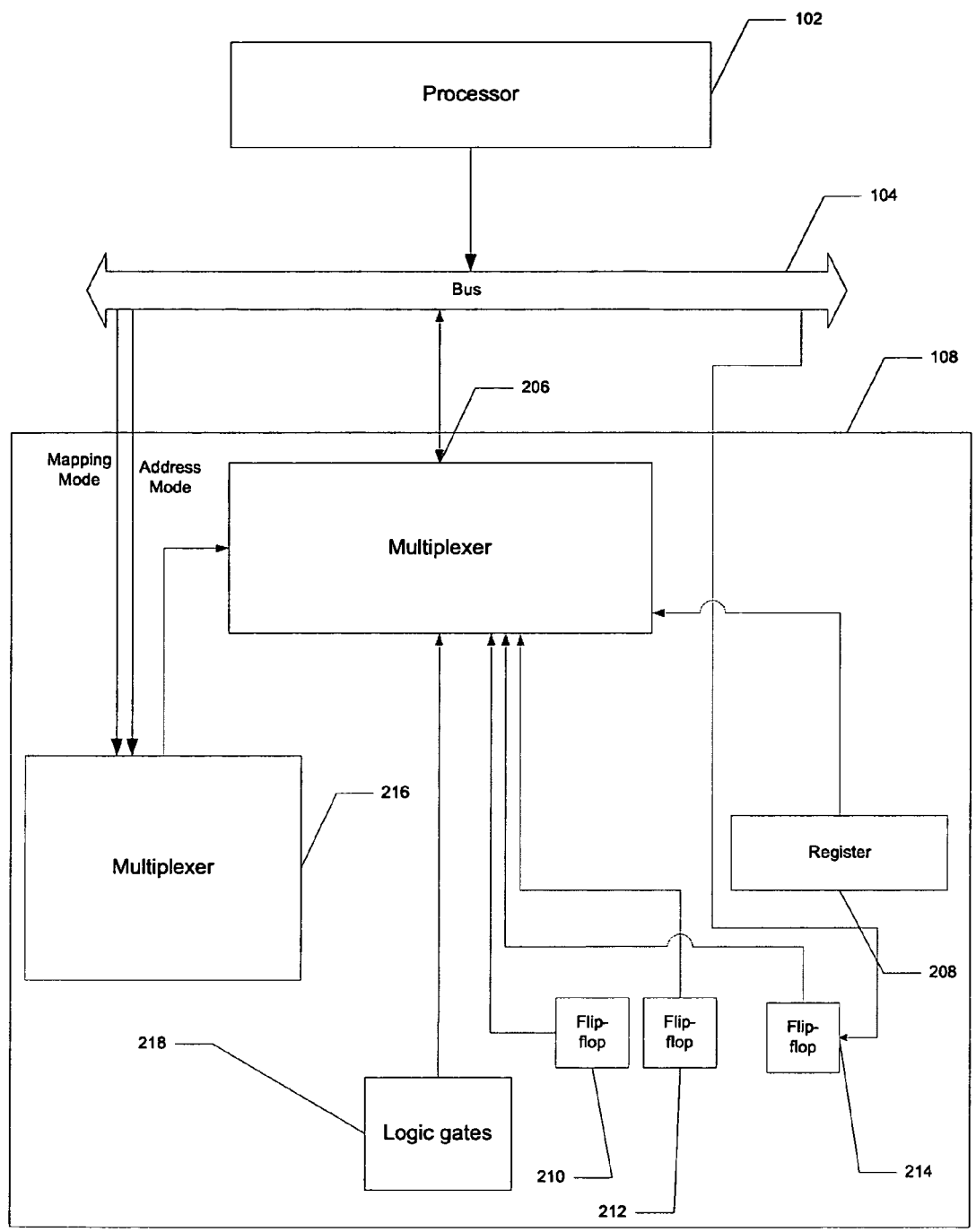
FIG. 2 is a block diagram that illustrates further details of an embodiment of a memory-less first level page table.

Referring to FIG. 2, further details of the system 100 are shown. The system 100 includes a processor 102, a memory bus 104, and a memory-less first level page table 108. The memory-less first level page table 108 includes a first multiplexer 206, a second multiplexer 216, logic gates and fixed address values 218, and a plurality of flip flop devices, such as the illustrative flip flops 210, 212 and 214. The second multiplexer 216 receives two inputs from the memory bus 104 labeled "mapping mode" and "address mode". The second multiplexer 216 provides an output 220 to the first multiplexer 206. The logic gates and fixed address values 218 provide an input to the first multiplexer 206. Similarly, the first multiplexer 206 receives inputs from the flip flops 210, 212 and 214. The logic gates and fixed address values 218 and flip flops 210, 212, and 214 may generally be referred to as address modules.

During operation, the first level multiplexer 206 receives address information from logic gates and fixed address values 218 and flip flops 210, 212 and 214. The address information is composed of a plurality of data segments. A first portion of the data segments may be held at a constant address value by the logic gates and fixed address values 218. A second portion of the data segments may be responsive to the flip flops 210, 212, and 214. A digital logic state of each of the flip flops is selectable by the processor 102. The first multiplexer 206 may operate in a plurality of address modes. The address mode is provided via output 220 from multiplexer 216. The address mode may be selected from a variety of modes including an error mode, a coarse mode, a fine mode and a section mode. The second multiplexer 216 may also be used to determine a mapping mode for the first multiplexer 206. The mapping mode may be selected from a direct mapping mode, a second level page table mode, or other appropriate operating mode. The output of multiplexer 216 is based on the mapping mode and address mode inputs provided by the processor. The first multiplexer 206 receives an address from the processor 102 and based on the inputs provided by the logic gates and fixed address values 218, the flip flops 210, 212 and 214, and the output 220 of multiplexer 216, the first multiplexer 206 provides a first level page table address to the processor 102. This first level page table address may be used to access a memory location directly, or may be used to access a second level page table stored in a memory, such as the table 112.

Figure 3:
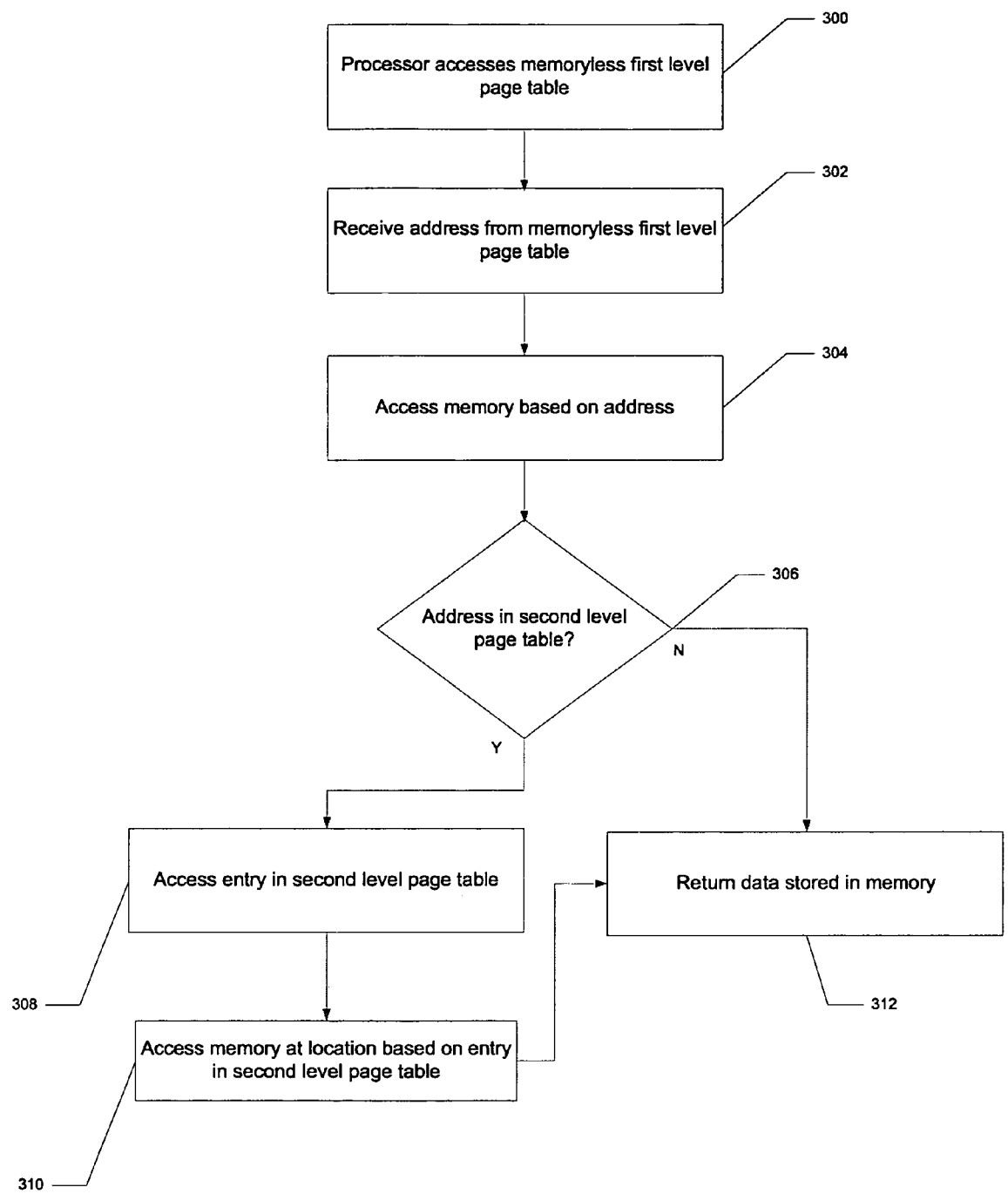
FIG. 3 is a flow chart that illustrates a method of accessing first and second level page tables.

Referring to FIG. 3, a method of addressing a memory-less first level page table and accessing a data location is shown. The method includes a processor that accesses a memoryless first level page table, as shown at 300. The method also includes receiving an address from the memory-less first level page table, at 302, and accessing a memory based on the address, as shown at 304. Referring to decision step 306, the address is evaluated as to whether it is found within a second level page table. In the event that the address is within a second level page table, then the second level page table within the computer readable memory is accessed, at 308, and a further memory access is performed based on the second level entry, as shown at 310. Referring back to decision step 306, in the event the address is a direct address from the first level page table and is not found in the second level page table, then the first level page table address is used to access data within the memory, as shown at 312. Where the first level page table provides a direct address, the physical address to the computer readable memory may be hard-wired instead of consuming memory resources. Alternatively, a portion of the memory address may be selectable by processor control and may be programmable, such as via use of a plurality of flip flops as shown with respect to FIG. 2.

In the event that the entry of the first level page table being accessed is not found within the computer readable memory, such as where the virtual memory address initiated by the processor was a page miss, then the first level page table provides an address that is indicative of an unavailable memory location.

Thus, the disclosed system and method provides a memory efficient technique for performing first and second level indexed reads and writes of computer memory. In a particular embodiment, the first level page table may have an addressing space of 16 kilobytes in size. In such embodiment, the computer readable memory may have a total memory space of 256 kilobytes. Thus, in this particular illustrative example, the memory address space of the first level page table is greater than 5% of the size of the computer memory. As such, by implementing the first level page table in memory-less circuitry, a significant amount of memory, such as greater than 5% of the memory, is beneficially available for other purposes. Also, it should be noted that the second level page table in a particular example consumes less space than the first level page table. For example, the second level page table may have a memory space requirement of less than 4 kilobytes.

Figure 4:
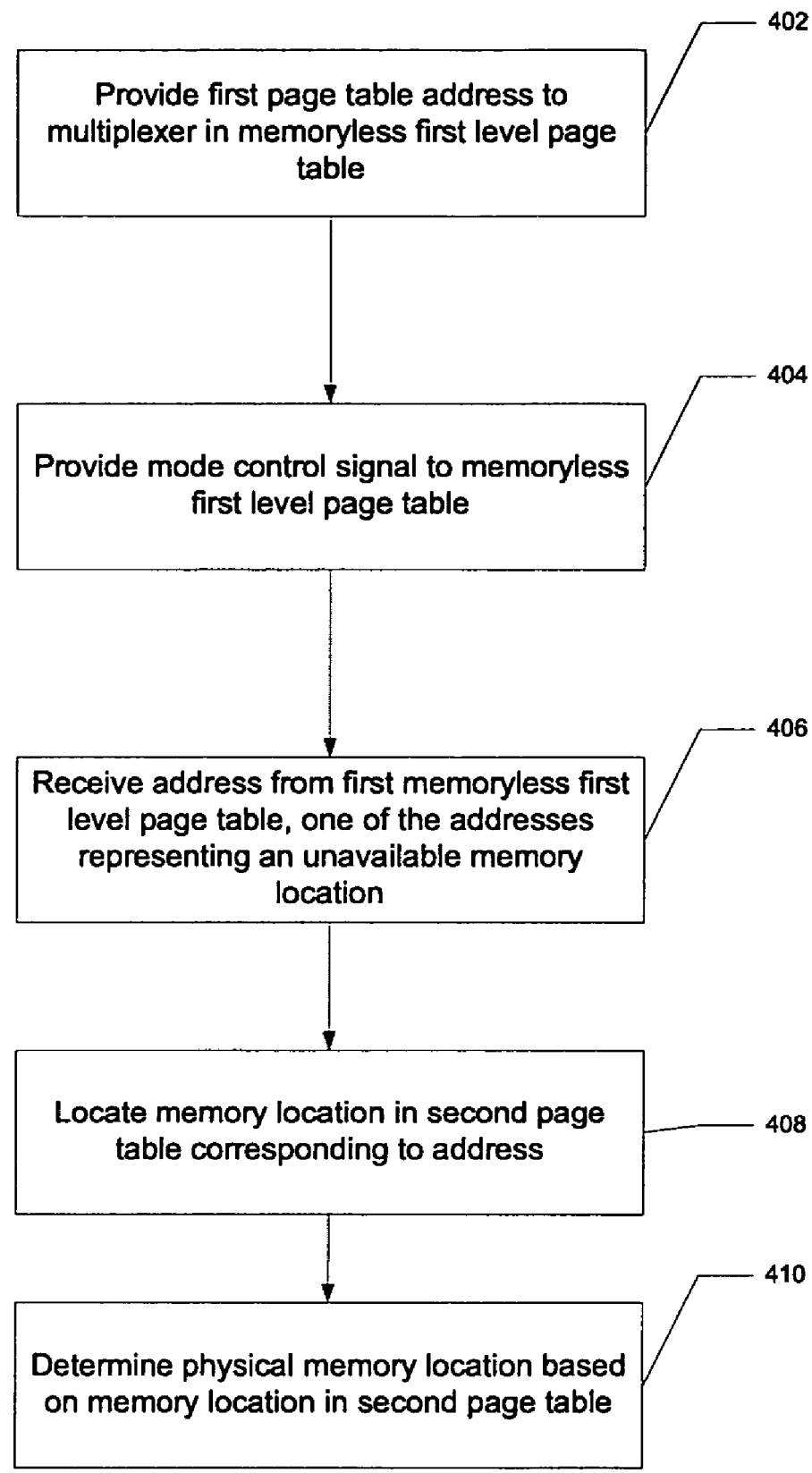
FIG. 4 is a flow chart that illustrates a method of addressing first and second level page tables.

Referring to FIG. 4, a method of accessing memory using first and second level page tables is shown. The method includes providing a first level page table address and a mode control signal to a multiplexer in a memory-less first level page table, at 402. The method further includes receiving a second address from the memory-less first level page table, as shown at 404. In a particular embodiment, the second address may be provided by the first multiplexer 206 within the first level page table 108. The method further includes locating a data location in a second level page table within the computer memory. The second page table entry corresponds to the second address, as shown at 406. The method further includes retrieving a data item from the computer memory at the identified data location provided by the second level page table. The data is retrieved from memory, as shown at 408.

Figure 5:
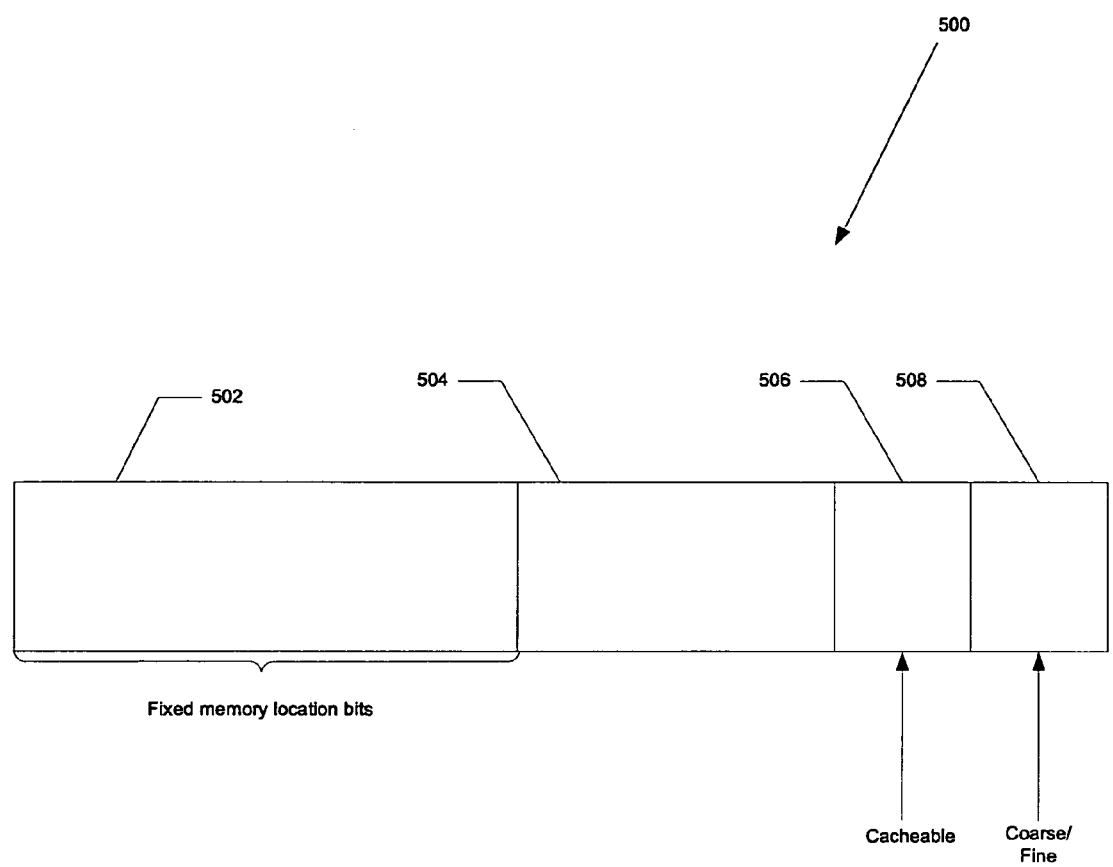
FIG. 5 is a general diagram that illustrates a data structure of a memory address.

Referring to FIG. 5, a data structure for an address that may be provided to the first multiplexer 206 is shown. The memory address structure includes a plurality of fixed memory location bits 502, a plurality of control bits 504, a cache bit 506 and a coarse or fine second level page control bit 508. The data structure 500 may be provided to the memory-less first level page table 108. The control bits 504, the cache bit 506, and the coarse/fine bit 508 may be used to select the state of one or more of the flip flops 210, 212 and 214. The fixed memory location bits 502 may be used to address the first multiplexer 206. The cache bit 506 can be used by the memory-less first level page table 108 to select whether the memory address provided by the first multiplexer 206 is associated with a data location that may be placed in a cache. The coarse/fine bit 508 may be used by the memory-less first page table 108 to select from at least two different second level page tables stored in a memory. The coarse/fine bit may select from a coarse second level page table or a fine second level page table. In this way, the plurality of flip flops 210, 212 and 214 may be placed in digital logic states representative of a memory access mode.

Also, while three representative flip flops 210, 212 and 214 have been shown for purposes of explanation, it should be understood that a plurality of flip flops would be used to implement each of the variant options of addresses providable by the memory-less first level page table in response to the control bits, the cache bit 506, and the coarse/fine control bit 508. Thus, the memory-less first level page table provides first level page table default functionality but also provides flexibility in that various flip flop elements may be programmed by the processor 102 under its control. In addition, while the particular illustrative embodiment utilizes flip flops, logic gates, and the illustrated multiplexers, it should be understood that a variety of other memory-less hardware circuits may be utilized to provide the first level page table operation.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a processor;
    a memoryless first level page table addressable by the processor, wherein the memoryless first level page table comprises:
        a first multiplexer coupled to the processor;
        a plurality of address modules coupled to the first multiplexer; and
        a second multiplexer coupled to the first multiplexer to determine a memory address mode for the first multiplexer; and
    a second level page table stored in a memory coupled to the processor;
    wherein the memoryless first level page table comprises a plurality of entries; and
    wherein the plurality of entries comprises at least one of a direct address and a second level page table address, wherein an entry of the memoryless first level page table that is a direct address is accessed and evaluated to determine whether the accessed entry is found within the second level page table before the accessed entry returns data stored in the memory.

2. The system of claim 1, wherein at least one of the plurality of address modules comprises a plurality of data segments, a first portion of the plurality of data segments held at a constant address value by a set of logic gates and a second portion of the plurality of data segments responsive to a plurality of flip-flops, wherein a digital logic state of each of the plurality of flip-flops is selectable by the processor.

3. The system of claim 2, wherein at least one of the plurality of address modules is associated with a memory location and wherein a digital logic state of at least one of the plurality of flip-flops is representative of a cacheable state of the memory location.

4. The system of claim 3, wherein the digital logic state of at least one of the plurality of flip-flops is representative of a memory access mode.

5. The system of claim 4, wherein the memory access mode is a one of a coarse mode and a fine mode.

6. The system of claim 2, wherein the memoryless first level page table comprises a plurality of entries, and at least one of the plurality of entries is a predetermined constant binary value.

7. The system of claim 6, wherein at least one of the plurality of entries is determined based on at least one of the plurality of flip-flops.

8. The system of claim 1, wherein the memory address mode is selected from one of an error mode, a coarse mode, a fine mode, and a section mode.

9. The system of claim 1, wherein the second multiplexer is used to determine a selection for the first multiplexer.

10. The system of claim 9, wherein the selection is one of a direct address and a second level page table address.

11. The system of claim 1, wherein the second level page table stores a plurality of physical memory addresses of a computer readable memory.

12. The system of claim 11, further comprising the computer readable memory.

13. The system of claim 12, further comprising a memory bus coupled to the computer readable memory.

14. A method comprising:
receiving a memory address from a memoryless first level page table, wherein the memoryless first level page table comprises:
a first multiplexer coupled to a processor
a plurality of address modules coupled to the first multiplexer; and
a second multiplexer coupled to the first multiplexer to determine a memory address mode for the first multiplexer;
accessing an entry in a second level page table that is stored at a data location in a memory device when the memory address references an unavailable memory location; and
accessing the data location in the memory device based on the memory address when the memory address references an available memory location, and wherein when the memory address is a direct address the memory address is evaluated to determine whether the memory address is found within the second level page table before the data location in the memory device is accessed.

15. The method of claim 14, wherein the memory address is hard wired.

16. The method of claim 14, wherein at least a portion of the memory address is stored by a plurality of flip-flops.

17. The method of claim 14, wherein the memory address is selected from a plurality of predetermined first level page table addresses, at least one of the predetermined first level page table addresses representative of an unavailable memory location.

18. A method comprising:
providing a first address to a memoryless first level page table, wherein the memoryless first level page table comprises:
a first multiplexer coupled to a processor;
a plurality of address modules coupled to the first multiplexer; and
a second multiplexer coupled to the first multiplexer to determine a memory address mode for the first multiplexer;
receiving a second address from the memoryless first level page table;
locating the second address after determining that the second address represents an available memory location in a memory, wherein when the second address is a direct address the second address is evaluated to determine whether the second address is found within a second level page table before the evaluated second address returns data stored in the memory; and
locating an entry in the second level page table stored in the memory after determining that the second address represents an unavailable memory location.

19. The method of claim 18, further comprising identifying the entry in the second level page table as a third address.

20. The method of claim 18, wherein the second address is selected from a plurality of page addresses, wherein at least one of the plurality of page addresses represents an unavailable memory location.

21. The method of claim 18, further comprising:
providing a memory address mode control signal to the memoryless first level page table.

22. The method of claim 18, wherein the first address is provided to a selection input of the first multiplexer and wherein the first multiplexer provides the second address.

23. A system comprising:
a processor;
a bus coupled to the processor;
a memory mapping module coupled to the bus, the memory mapping module including a first input to receive a virtual memory address, the mapping module including a memoryless first level page table, the mapping module having an output to provide a memory address, wherein the memoryless first level page table comprises:
a first multiplexer coupled to the processor;
a plurality of address modules coupled to the first multiplexer; and
a second multiplexer coupled to the first multiplexer to determine a memory address mode for the first multiplexer;
a memory device responsive to the memory mapping module; and
a second level page table stored in the memory device, wherein the memory address is one of a fixed direct memory address and a pointer to a data location in the second level page table, wherein when the memory address is a fixed direct memory address the fixed direct memory address is evaluated to determine whether the fixed direct memory address is found within the second level page table before the fixed direct memory address returns data stored in the memory device.

24. The system of claim 23, wherein the memoryless first level page table has a larger address space than the second level page table.

25. The system of claim 23, wherein the second level page table is uncompressed.

26. The system of claim 23, wherein the second level page table is stored in less than one percent of a memory capacity of the memory device.

27. The system of claim 23, wherein the first level page table is capable of addressing a memory space of a first size, and wherein the memory device has a memory capacity of a second size, the first size greater than 5% of the second size.

* * * * *